United States Patent
Rogers et al.

(10) Patent No.: US 9,927,220 B2
(45) Date of Patent: Mar. 27, 2018

(54) DATUM TRANSFER APPARATUS AND METHOD FOR INSPECTING COATED COMPONENTS

(71) Applicant: UNITED TECHNOLOGIES CORPORATION, Farmington, CT (US)

(72) Inventors: Thomas H. Rogers, East Hampton, CT (US); Randall W. Joyner, Union, CT (US); James R. Murdock, Tolland, CT (US); Andrew J. Brinks, Fenton, MI (US); Michael A. Morden, Holt, MI (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 359 days.

(21) Appl. No.: 14/767,864

(22) PCT Filed: Dec. 18, 2013

(86) PCT No.: PCT/US2013/076004
§ 371 (c)(1),
(2) Date: Aug. 13, 2015

(87) PCT Pub. No.: WO2014/143285
PCT Pub. Date: Sep. 18, 2014

(65) Prior Publication Data
US 2015/0369582 A1    Dec. 24, 2015

Related U.S. Application Data

(60) Provisional application No. 61/791,565, filed on Mar. 15, 2013.

(51) Int. Cl.
*G01B 5/008* (2006.01)
*F01D 9/02* (2006.01)
(Continued)

(52) U.S. Cl.
CPC .............. *G01B 5/008* (2013.01); *F01D 5/005* (2013.01); *F01D 5/141* (2013.01); *F01D 5/288* (2013.01);
(Continued)

(58) Field of Classification Search
CPC .......... F01D 5/288; F01D 5/005; F01D 5/141; G01B 5/004; G01B 5/008; G01B 11/03;
(Continued)

(56) References Cited

U.S. PATENT DOCUMENTS 6,416,278 B1 * 7/2002 Caddell, Jr. ............. B23P 6/002
29/402.03
7,351,290 B2 * 4/2008 Rutkowski ............ B05C 5/0216
118/683

(Continued)

FOREIGN PATENT DOCUMENTS

| | | |
|---|---|---|
| JP | 01-277705 A | 11/1989 |
| JP | 7085995 B2 | 9/1995 |
| JP | 2012-061553 A | 3/2012 |

OTHER PUBLICATIONS

European Search Report for Application No. EP 13 87 7533.
International Search Report Application No. PCT/US2013/076004; dated Apr. 14, 2014.

*Primary Examiner* — Mark Laurenzi
*Assistant Examiner* — Xiaoting Hu
(74) *Attorney, Agent, or Firm* — Cantor Colburn LLP

(57) ABSTRACT

A method of inspecting components between a pre-coated state and a post-coated state is provided. The method entails providing at least first and second datum points onto the component in the pre-coated state, where each of the at least first and second datum points have a substantially hemispherical shape and a center point. The center points of each of the at least first and second datum points are utilized for measurement of a selected portion on the component in the (Continued)

pre-coated state. Then, the component is coated. Next, the center points of each of the at least first and second datum points are utilized for measurement of the selected portion on the component in the post-coated state. The pre-coated state measurements and the post-coated state measurements are then correlated for inspection purposes.

20 Claims, 5 Drawing Sheets

(51) Int. Cl.
*F01D 5/28* (2006.01)
*G01M 13/00* (2006.01)
*F01D 5/14* (2006.01)
*F01D 5/00* (2006.01)
*G01B 11/03* (2006.01)
*F01D 21/00* (2006.01)

(52) U.S. Cl.
CPC ............. *F01D 9/02* (2013.01); *F01D 21/003* (2013.01); *G01B 11/03* (2013.01); *G01M 13/00* (2013.01); *F05D 2220/32* (2013.01); *F05D 2230/90* (2013.01); *F05D 2260/83* (2013.01)

(58) Field of Classification Search
CPC ............. F05D 2230/90; F05D 2260/83; Y10T 29/49336; Y10T 29/49764; Y10T 29/49769; Y10T 29/49778; Y10T 29/4978; Y10T 29/4998; Y10T 29/49982; B23P 15/02; B23P 15/04; B05C 11/1005
USPC .................. 356/600–640; 33/1 BB; 427/290; 118/712, 713
See application file for complete search history.

(56) References Cited

U.S. PATENT DOCUMENTS

| | | | |
|---|---|---|---|
| 2003/0080297 A1 | 5/2003 | Bales et al. | |
| 2006/0291716 A1* | 12/2006 | Vaidyanathan | F01D 5/005 382/152 |
| 2007/0019213 A1 | 1/2007 | Vaidyanathan | |
| 2007/0279645 A1* | 12/2007 | Dratwinski | C23C 2/14 356/630 |
| 2009/0220349 A1* | 9/2009 | Bolms | F01D 5/005 416/97 R |
| 2009/0265932 A1* | 10/2009 | Lange | B23P 6/005 29/889.1 |
| 2013/0268107 A1* | 10/2013 | Bostanjoglo | F01D 5/005 700/166 |

* cited by examiner

DATUM TRANSFER APPARATUS AND METHOD FOR INSPECTING COATED COMPONENTS

CROSS-REFERENCE TO RELATED APPLICATION

This patent application is a US National Stage under 35 U.S.C. § 371, claiming priority to International Application No. PCT/US13/076004 filed on Dec. 18, 2013, which claims priority under 35 U.S.C. § 119(e) to U.S. patent application Ser. No. 61/791,565 filed on Mar. 15, 2013.

TECHNICAL FIELD

The subject matter of the present disclosure generally relates to gas turbine engines, and more particularly, to methods of inspecting components of gas turbine engines.

BACKGROUND

In the manufacture of gas turbine engines, and other complicated pieces of machinery, many components of the engine need to be inspected prior to assembly to ensure compliance with dimensional requirements. For example, after a component is produced, it is common practice to inspect the component using a coordinate measuring machine (CMM). An accurate and precise measurement of a finished component is desired to ensure uniformity and quality. It is well known in the industry that a dimension of a desired portion on a component can be measured by using datum points as references, which locate the part in the six degrees of freedom needed to fully constrain the part.

Generally speaking, during the manufacturing process, simple planar datum points are located directly on the component for primary machining purposes. In most instances, these same planar datum points are used during the inspection processes. However, the location choice of these planar datum points are typically chosen in a manner that is best suited for particular manufacturing processes without regard to usage of the planar datum points during the later inspection processes.

Not all inspections are as simple as using the planar datum points to take measurements of a finished component. In certain instances during the manufacturing processes, a component may be coated, in its entirety or in part, with a protective or ornamental material. Some of these coatings have a significant thickness to them, which needs to be accounted for when inspecting and correlating the dimensions of the component. For example, in the manufacture of airfoils for gas turbine engines, particularly aluminum airfoils, relatively thick coatings are applied to protect the airfoil from corrosion and erosion. While such coatings are effective, they present a challenge in terms of inspection.

As mentioned before, the planar datum points are typically chosen based on what is best for the manufacturing processes without regard to the inspection processes. This is true even when the component needs to be coated. Moreover, when choosing the location of the planar datum points on the component little effort is made in marking the datum points in a location that avoids coating over the datum points. Particularly, such prior art techniques present a problem in that the coating over the planar datum points prevents the datum points from being used when correlating pre-coated dimensions to post-coated dimensions during inspection.

Thus, there is a need for a method of transferring datum points from a pre-coated state of a component to a post-coated state of the component to expedite the inspection process.

SUMMARY

In accordance with an aspect of the disclosure, a method of inspecting components between a pre-coated state and a post-coated state is provided. The method entails providing at least first and second datum points onto the component in the pre-coated state, where each of the at least first and second datum points have a substantially hemi-spherical shape and a center point. The center points of each of the at least first and second datum points are utilized for measurement of a selected portion on the component in the pre-coated state. Then, the component is coated. Next, the center points of each of the at least first and second datum points are utilized for measurement of the selected portion on the component in the post-coated state. The pre-coated state measurements and the post-coated state measurements are then correlated for inspection purposes.

In accordance with another aspect of the disclosure, the method of inspecting components between a pre-coated state and a post-coated state further entails providing a third datum point, having a substantially hemi-spherical shape and a center point, onto the component.

In accordance with yet another aspect of the disclosure, the method of inspecting components between a pre-coated state and a post-coated state entails each of the at least first through third datum points having diameters measuring approximately 0.375 inches.

In further accordance with still another aspect of the disclosure, the method of inspecting components between a pre-coated state and a post-coated state further entails providing a third datum point, having a substantially cylindrical shape and a center point, onto the component.

In accordance with another aspect of the disclosure, the method of inspecting components between a pre-coated state and a post-coated state entails the component having a flat planar surface.

In accordance with another aspect of the disclosure, the method of inspecting components between a pre-coated state and a post-coated state entails each of the at least first and second datum points being located on the flat planar surface of the component.

In further accordance with yet another aspect of the disclosure, the method of inspecting components between a pre-coated state and a post-coated state further entails providing a fourth datum point, which is used in conjunction with the center point of the at least first datum point and the at least third datum point, for measurement of the selected portion on the component in the pre-coated state and the post-coated state.

In accordance with an aspect of the disclosure, an airfoil is provided. The airfoil has an attachment with a flat surface and a blade that extends longitudinally from the attachment. Disposed on the flat surface are at least first and second datum points, each of the at least first and second datum points having a substantially hemi-spherical shape and a center point, the center points and the flat surface being used for transferring measurements of a selected portion on the airfoil from a pre-coated state to a post-coated state.

In accordance with another aspect of the disclosure, the airfoil also includes a third datum point.

In accordance with yet another aspect of the disclosure, the airfoil includes the third datum point having a substantially hemi-spherical shape and a center point in which the center point is being used for transferring measurements of the selected portion on the airfoil from the pre-coated state to the post-coated state.

In further accordance with another aspect of the disclosure, the airfoil includes each of the first through third datum points having diameters of approximately 0.375 inches.

In further accordance with yet another aspect of the disclosure, the airfoil includes a third datum point having a substantially cylindrical shape and a center point used for transferring measurements of the selected portion of the airfoil from the pre-coated state to the post-coated state.

In further accordance with another aspect of the disclosure, the flat surface of the airfoil serves as the third datum point for use in transferring measurements of the selected portion on the airfoil from the pre-coated state to the post-coated state.

In further accordance with still another aspect of the disclosure, the airfoil further includes a fourth datum point being used for transferring measurements of the selected portion on the airfoil from the pre-coated state to the post-coated state.

In accordance with an aspect of the disclosure, a system for inspecting components of a gas turbine engine is provided. The system includes a measuring probe, a processor and a platform. The platform is designed to receive the component, which includes at least first and second datum points that have a substantially hemi-spherical shape and a center point so that the measuring probe and processor can measure the first and second datum points in a pre-coated state and a post-coated state.

In accordance with another aspect of the disclosure, the system includes the measuring probe which employs a white light measurement method.

In accordance with yet another aspect of the disclosure, the system includes the measuring probe, the processor and the platform which are all part of a coordinate measuring machine.

In further accordance with another aspect of the disclosure, the system includes the component having a third datum point, which has a substantially hemi-spherical shape and a center point.

In further accordance with still another aspect of the disclosure, the system includes the component having a flat surface serving as a third datum point.

In further accordance with yet another aspect of the disclosure, the system includes the component, which is an airfoil.

Other features and advantages of the disclosed systems and methods will be appreciated from reading the attached detailed description in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

As noted above, the disclosure pertains primarily to a method of transferring datum points from a pre-coated state of a component to a post-coated state of the component to expedite the inspection process. It is to be noted, however, that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
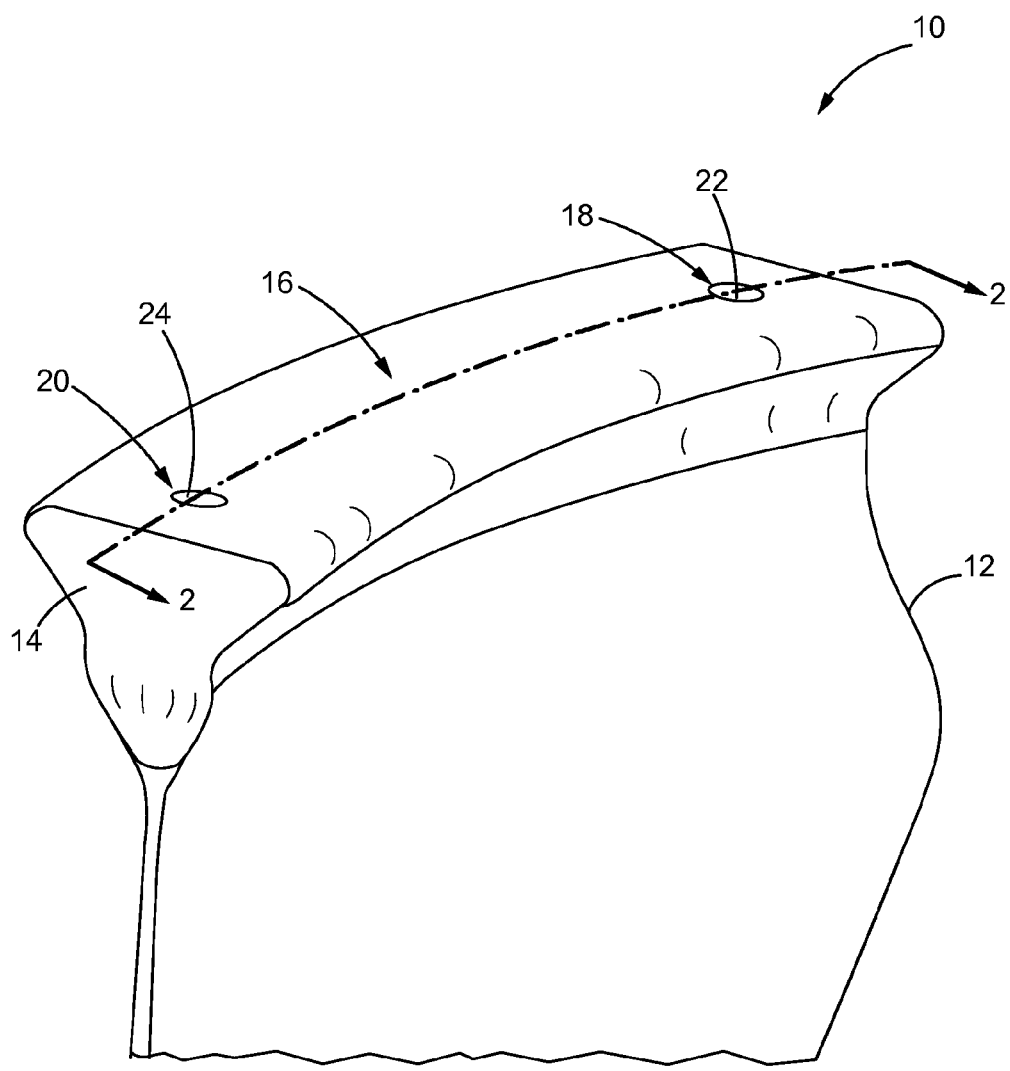
FIG. 1 is a perspective view of a fragmentary section of an airfoil constructed in accordance with the teachings of this disclosure.

Referring now to the drawings, and with specific reference to FIG. 1, a component manufactured in accordance with the present disclosure is generally referred to by reference numeral 10. Throughout the following disclosure reference will be made to the component as being an airfoil, such as a blade or vane of a gas turbine engine, but it is to be understood that the teachings of this disclosure can be employed with equal effect to any component needing precise measurement. Moreover, it is noted that the use of "component" and "airfoil" are interchangeable. "Airfoil" is used to denote a particular type of component and is used in order to more clearly describe the method of the present disclosure. Therefore, it is understood that the present disclosure is not limited to airfoils, but applies to all components, which generally have a pre-coated and post-coated state as will now be described.

Furthermore, throughout the disclosure reference is made to datum "points". It is to be understood that the use of "points" is to denote any general datum feature. Thus, the use of "points" is not limited to the strict definition as is generally known and is interchangeable with words such as "feature" and "line" where appropriate.

As an example of the present invention, discussion is directed toward the manufacturing and inspecting processes of airfoils as generally used in the jet engine industry. Such airfoils are commonly manufactured from titanium metal. The strong, low-density and highly corrosion-resistant properties of titanium are ideal for use in aerospace applications. However, in an effort to improve upon the current technology and make the airfoil even lighter, the industry is moving in the direction of fabricating such airfoils from aluminum alloy.

Unlike a titanium airfoil, an aluminum alloy airfoil requires coatings on all surfaces to protect the metal from corrosion and erosion caused by the elements. In particular, the aluminum alloy airfoil is masked and then coated with polyurethane for protection. The masking and polyurethane coating add a significant thickness to the airfoil. Moreover, coating the entire surface of the aluminum alloy airfoil covers over the planar datum points that may be originally marked on the surface of the pre-coated airfoil. This covering over of the planar datum points presents a problem when inspecting the airfoil because the planar datum points can no longer be used when inspecting the airfoil in the post-coated state. It is in this regard that the present disclosure greatly improves upon the prior art.

Referring again to FIG. 1, the airfoil 10 is shown to include a blade 12, which extends longitudinally from an attachment 14, such as a dovetail attachment. The attachment 14 has a flat surface 16 on which are provided a first datum point 18 and a second datum point 20. Both datum points 18,20 may be hemi-spherical in shape as shown and have center points 22,24, respectively. Flat surface 16 may be used as a third datum point, specifically when the exact thickness of the coating is known or can be measured by other means, as described later herein.

Figure 2:
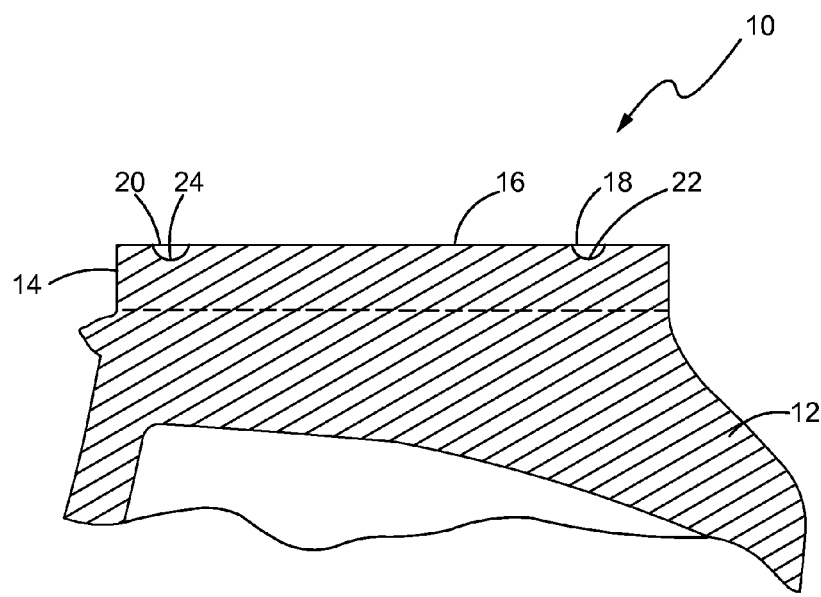
FIG. 2 is a cross-sectional view of the airfoil of FIG. 1 taken along line 2-2 of FIG. 1.

As shown best in FIG. 2, in the pre-coated state, both the first datum point 18 and the second datum point 20 are designed to be substantially hemi-spherical in shape and have diameters that measure approximately 0.375 inches. However, other shapes and dimensions are certainly possible. Regardless of the dimension used, what is of import is that, the first and second datum points 18,20 have a predetermined depth dimension with respect to the flat surface 16. This inclusion of the first and second data points 18,20 onto the flat surface 16, in its pre-coated state, facilitates inspecting and correlating pre-coated dimensions to post-coated dimensions as described in more detail further below.

It is important to note that after the coating process, the first and second datum points 18,20 are not entirely filled in with coating material and thus maintain their pre-coated shape albeit with a slightly decreased diameter measurement. Because the center point of a hemi-spherical shape is independent of its diameter, the first and second datum points 18,20 have the same center points 22,24 before and after the coating process. In other words, the center points 22,24 in the pre-coated state have the same dimension as in the post-coated state even though the diameters of the first and second datum points 18,20 are changed due to the thickness of the coating. Thus, it can be seen that the design of the first and second datum points 18,20 overcome the problem of the prior art planar datum points of being coated over and unusable in the post-coated state. Furthermore, the design of these datum points 18,20 allow these datum points to be used as primary machining datum points, as well as, transfer datum points, increasing flexibility in machining and fabricating components.

Figure 3:
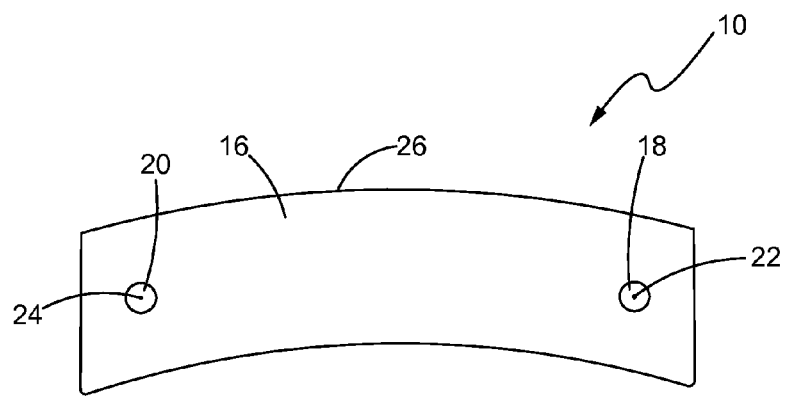
FIG. 3 is a top plan view of the airfoil of FIG. 1.

For example, and with particular reference to FIG. 3, the center points 22,24 of the datum points 18,20, respectively, and flat surface 16, acting as a third datum point, are used to measure the airfoil 10 in the post-coated state. Having already used the first and second datum points 18,20 and the flat surface 16 to measure the airfoil 10 in the pre-coated state, the present disclosure can now correlate the measurements of airfoil 10 in the pre-coated and post-coated states for inspection purposes. The technique of using these datum points 18,20 and flat surface 16 are particularly useful during CMM or white light inspection because the inspection data can be taken over the entire surface of the airfoil 10, including the surfaces of the datum points 18,20, which makes it simple to find the center points 22,24.

In another aspect of the embodiment, three datum points are used in place of two datum points 18,20 and a flat surface 16. Because it is well known in the industry that a dimension of a desired portion on a component can be measured by using datum points as references, which locate the part in the six degrees of freedom needed to fully constrain the part, it is appreciated that the location of the three datum points may be located anywhere on the component in order to measure any desired portion on the component. Similarly, the number of datum points used may be in excess of three such as four or more. Further, the diameter of the datum points may vary in size to fit the need of the particular component being inspected.

Figure 4:
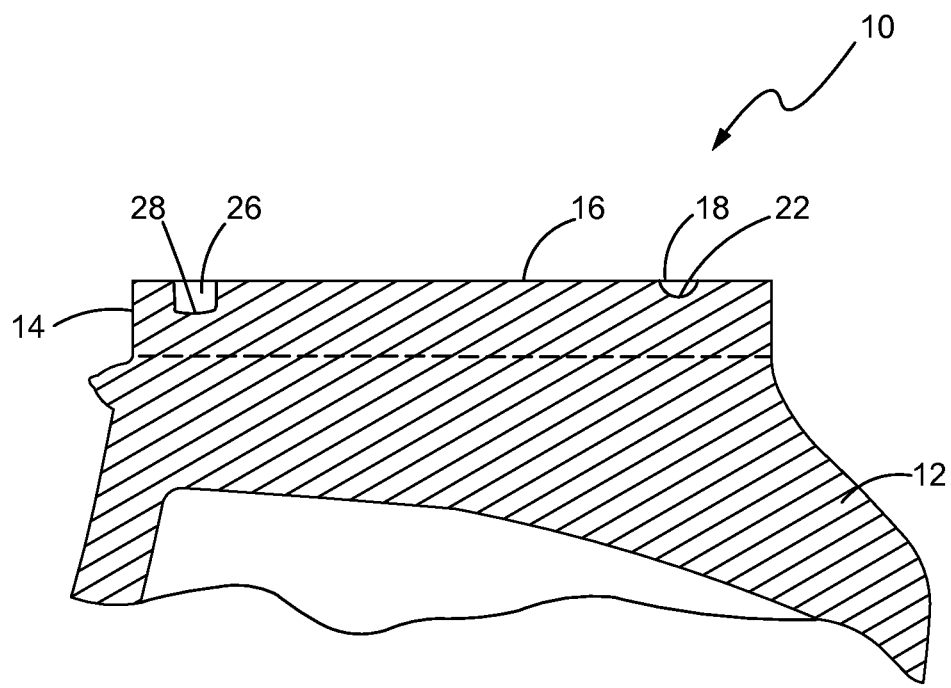
FIG. 4 is a cross-sectional view of an airfoil similar to FIG. 1, including a substantially cylindrical datum point.

In yet another aspect of the embodiment, as shown in FIG. 4, one hemi-spherical datum point, one flat surface and one substantially cylindrical datum point 26 may be used in place of two hemi-spherical datum points and a flat surface. The cylindrical datum point 26 includes a substantially circular shape having a center point 28. Since the cylindrical datum point 26 maintains its shape from a pre-coated state to a post-coated state, its center point 28 is also the same in both states. Thus, it is appreciated that the cylindrical datum point 26 is utilized in the same manner as described above for the hemi-spherical datum points. Expounding upon this, in a further aspect of the embodiment, at least three datum points of any shape that has a center point dimension, which is the same in the pre-coated state and the post-coated state, may be used in place of two hemi-spherical datum points 18,20 and a flat surface 16.

Figure 5:
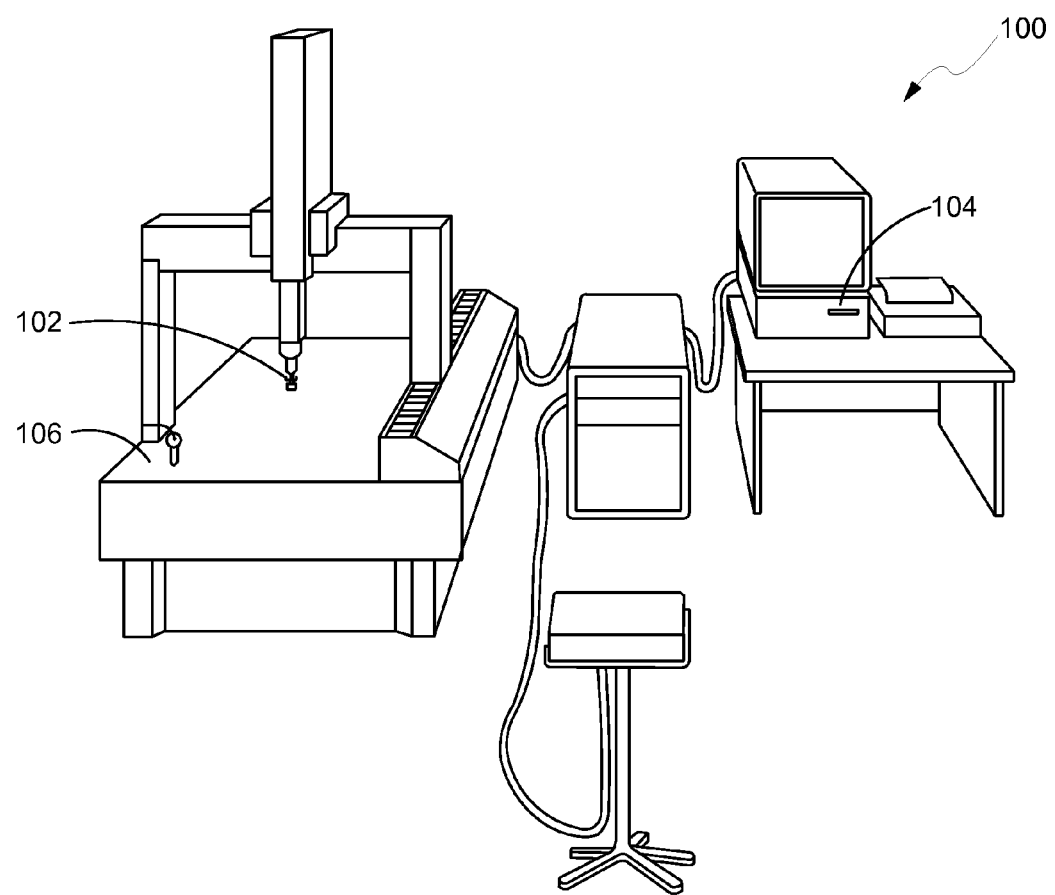
FIG. 5 is a schematic view of a coordinate measuring machine.
Figure 6:
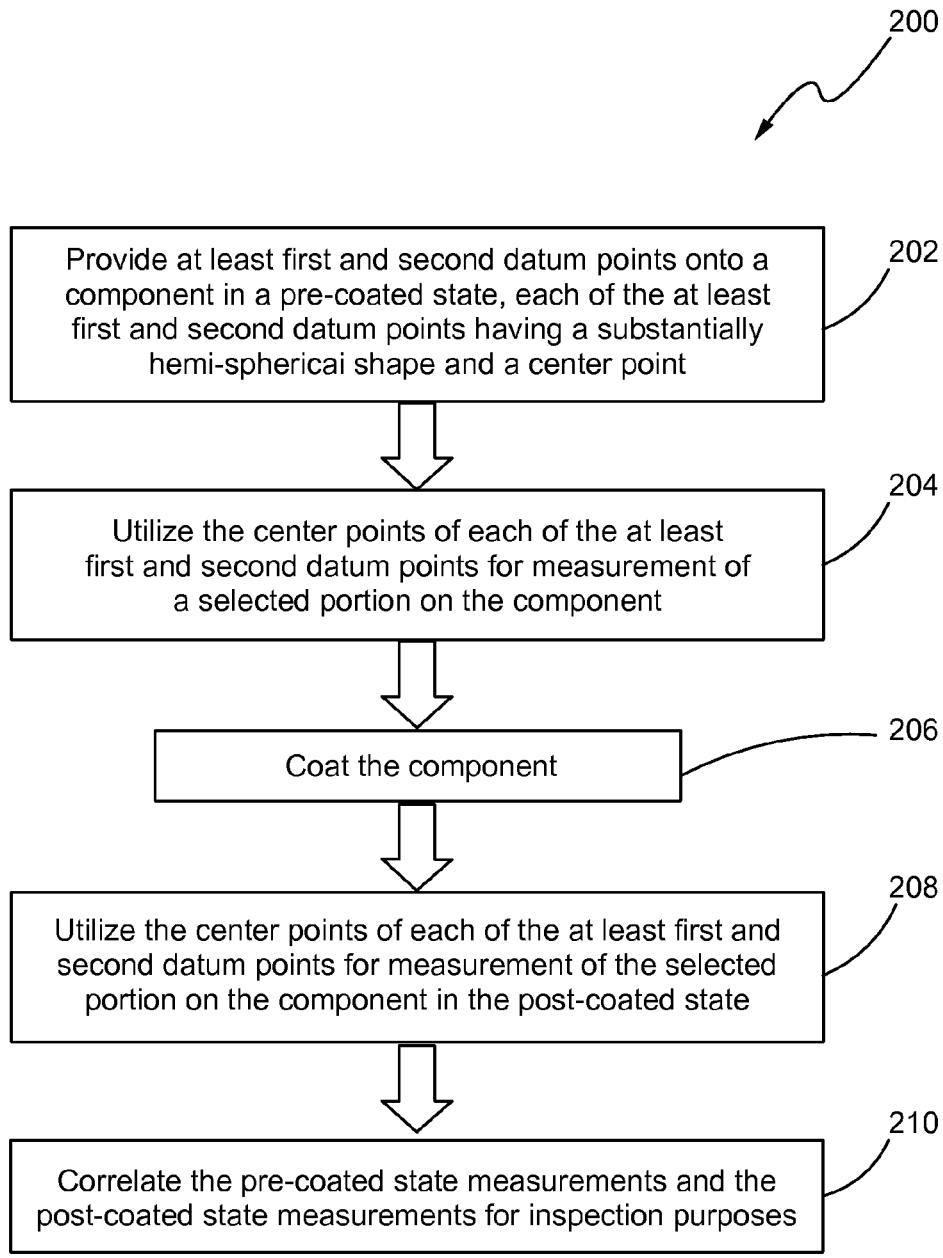
FIG. 6 is a flowchart illustrating the steps of the present disclosure.

In operation, the present disclosure may be used to assist the inspection system of FIG. 5 and practice of the method of FIG. 6. FIG. 5 illustrates a system, generally referred to by reference numeral 100, for inspecting components of a gas turbine engine. The system 100 includes a measuring probe 102 and a processor 104, which is operationally associated with the measuring probe 102. The system 100 also includes a platform 106, which is operationally associated with the measuring probe 102. The platform 106 is designed to receive the component 10 in a manner so that the measuring probe 102 and processor 104 measure the center points 22,24 of the first and second datum points 18,20 in a pre-coated state and a post-coated state. In one embodiment of the system 100, the measuring probe 102 employs a white light measurement method. In another embodiment of the system 100, the measuring probe 102, the processor 104 and the plat form 106 are part of a coordinate measuring machine (CMM). Another embodiment of the system 100, includes a third datum point having a substantially hemi-spherical shape and a center point. In yet another embodiment, the component further includes a flat surface serving as a third datum point. And in a further embodiment, the component is an airfoil.

FIG. 6 illustrates a flowchart 200 of a method of inspecting components between a pre-coated state and a post-coated state. Box 202 shows the first step of providing at least first and second datum points onto the component in a pre-coated state. Each of the at least first and second datum points have a substantially hemi-spherical shape and a center point. Next, the center points of each of the at least first and second datum points are utilized for measurement of a selected portion on the component. This step is shown in box 204. Box 206 is the step of coating the component. In the next step of the method, the center points of each of the at least first and second datum points are utilized for measurement of the selected portion on the component in the post-coated state, as shown in box 208. Box 210 shows the final step of correlating the pre-coated state measurements and the post-coated state measurements for inspection purposes.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A method of inspecting components of a gas turbine engine between a pre-coated state and a post-coated state, comprising:
providing at least first and second datum points onto the component in the pre-coated state, each of the at least first and second datum points having a substantially hemi-spherical shape and a center point;
utilizing the center points of each of the at least first and second datum points for measurement of a selected portion on the component in the pre-coated state;
coating the component, wherein the at least first and second datum point are not entirely filled;
utilizing the center points of each of the at least first and second datum points for measurement of the selected portion on the component in the post-coated state; and
correlating the pre-coated state measurements and the post-coated state measurements for inspection purposes.

2. The method of claim 1, wherein a third datum point having a substantially hemi-spherical shape and a center point is provided on the component.

3. The method of claim 2, wherein each of the at least first through third datum points have a diameter of approximately 0.375 inches.

4. The method of claim 1, wherein a third datum point having a substantially cylindrical shape and a center point is provided on the component.

5. The method of claim 1, wherein the component further includes a flat planar surface.

6. The method of claim 5, wherein each of the at least first and second datum points are located on the flat planar surface of the component.

7. The method of claim 2, further including a fourth datum point, which is used in conjunction with the center point of the at least first datum point and the at least third datum point, for measurement of the selected portion on the component in the pre-coated state and post-coated state.

8. An airfoil comprising:
an attachment having a flat surface;
a blade extending longitudinally from the attachment; and
at least first and second datum points being disposed on the flat surface of the attachment, each of the at least first and second datum points having a substantially hemi-spherical shape and a center point, the center points and the flat surface being used for transferring measurements of a selected portion on the airfoil from a pre-coated state to a post-coated state, wherein the at least first and second datum points are configured such that they are not entirely filled in when the airfoil is in the post-coated state.

9. An airfoil of claim 8, further including a third datum point.

10. An airfoil of claim 9, wherein the third datum point has a substantially hemi-spherical shape and a center point, the center point of the third datum point, in conjunction with the center points of each of the at least first and second datum points, being used for transferring measurements of the selected portion on the airfoil from the pre-coated state to the post-coated state.

11. An airfoil of claim 10, wherein each of the first through third datum points have a diameter of approximately 0.375 inches.

12. An airfoil of claim 9, wherein the third datum point has a substantially cylindrical shape and a center point used for transferring measurements of the selected portion on the airfoil from the pre-coated state to the post-coated state.

13. An airfoil of claim 8, wherein the flat surface is a third datum point used for transferring measurements of the selected portion on the airfoil from the pre-coated state to the post-coated state.

14. An airfoil of claim 13, further including a fourth datum point used, in conjunction with the third datum point and the center points of each of the at least first datum point and the at least second datum point, for transferring measurements of the selected portion on the airfoil from the pre-coated state to the post-coated state.

15. A system for inspecting a component of a gas turbine engine, comprising:
a measuring probe;
a processor operationally associated with the measuring probe; and
a platform receiving the component, the component including at least first and second datum points each having a substantially hemi-spherical shape and a center point, the measuring probe and processor measuring the center points of each of the at least first and second datum points in a pre-coated state and a post-coated state, wherein the at least first and second datum points are configured such that they are not entirely filled in when the component is in the post-coated state.

16. The system of claim 15, wherein the measuring probe employs a white light measurement method.

17. The system of claim 15, wherein the measuring probe, processor and platform are part of a coordinate measuring machine.

18. The system of claim 15, wherein the component further includes a third datum point having a substantially hemi-spherical shape and a center point.

19. The system of claim 15, wherein the component further includes a flat surface serving as a third datum point.

20. The system of claimed 15, wherein the component is an airfoil.

* * * * *